(12) United States Patent
Hashimoto

(10) Patent No.: US 11,140,287 B2
(45) Date of Patent: Oct. 5, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yoshinori Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/937,019

(22) Filed: Jul. 23, 2020

(65) Prior Publication Data

US 2021/0044709 A1 Feb. 11, 2021

(30) Foreign Application Priority Data

Aug. 8, 2019 (JP) .............................. JP2019-146639

(51) Int. Cl.
*H04N 1/00* (2006.01)
*G06F 3/0486* (2013.01)
*G06F 3/0484* (2013.01)
*G06F 3/0483* (2013.01)

(52) U.S. Cl.
CPC ....... *H04N 1/00456* (2013.01); *G06F 3/0483* (2013.01); *G06F 3/0486* (2013.01); *G06F 3/04842* (2013.01); *G06F 3/04845* (2013.01); *H04N 1/00196* (2013.01)

(58) Field of Classification Search
CPC .............. G06T 11/60; G06T 2200/24; G06T 2207/20092; G06T 2207/20221; G06F 3/0481; G06F 3/0482; G06F 3/04845; H04N 1/00161
See application file for complete search history.

(56) References Cited

U.S. PATENT DOCUMENTS

| | | | |
|---|---|---|---|
| 9,153,056 B2* | 10/2015 | Hilt ...................... | H04N 1/3877 |
| 2005/0044485 A1* | 2/2005 | Mondry ................. | G06T 11/60 |
| | | | 715/247 |
| 2006/0174568 A1* | 8/2006 | Kinoshita ........... | G06F 3/04845 |
| | | | 52/395 |
| 2010/0199227 A1* | 8/2010 | Xiao ...................... | G06F 3/0481 |
| | | | 715/863 |
| 2010/0223568 A1* | 9/2010 | Quek ..................... | G06T 11/60 |
| | | | 715/765 |

(Continued)

FOREIGN PATENT DOCUMENTS

JP 2010-176275 A 8/2010

*Primary Examiner* — Justin S Lee
(74) *Attorney, Agent, or Firm* — Canon U.S.A., Inc. IP Division

(57) ABSTRACT

An information processing apparatus includes a selection unit, a switching unit, a layout unit, and an output unit and is to perform an object snapping function of laying out a new object in a spread page area by automatically aligning a position of the new object with respect to a layout position of an object already laid out in the spread page area. The selection unit selects an object as a selected object. The switching unit switches enabling and disabling of the object snapping function based on a user operation. The layout unit lays out the selected object in the spread page area by using the object snapping function in a case where the object snapping function is enabled. The output unit outputs album data including the spread page area in which the selected object is laid out.

19 Claims, 15 Drawing Sheets

(56) References Cited

U.S. PATENT DOCUMENTS

| | | | |
|---|---|---|---|
| 2012/0206771 A1* | 8/2012 | Cok | H04N 1/00167 358/1.18 |
| 2013/0311329 A1* | 11/2013 | Knudson | G06Q 30/0639 705/26.9 |
| 2014/0010461 A1* | 1/2014 | Sugai | G06T 11/60 382/206 |
| 2014/0313551 A1* | 10/2014 | Lyren | H04N 1/00164 358/1.18 |
| 2015/0009359 A1* | 1/2015 | Zaheer | H04N 5/232 348/223.1 |
| 2015/0264301 A1* | 9/2015 | Paragano | H04L 12/1813 348/14.07 |
| 2016/0092091 A1* | 3/2016 | Hanson | G06F 40/106 715/763 |
| 2018/0220075 A1* | 8/2018 | Castro Calderon | G06F 3/0482 |

* cited by examiner

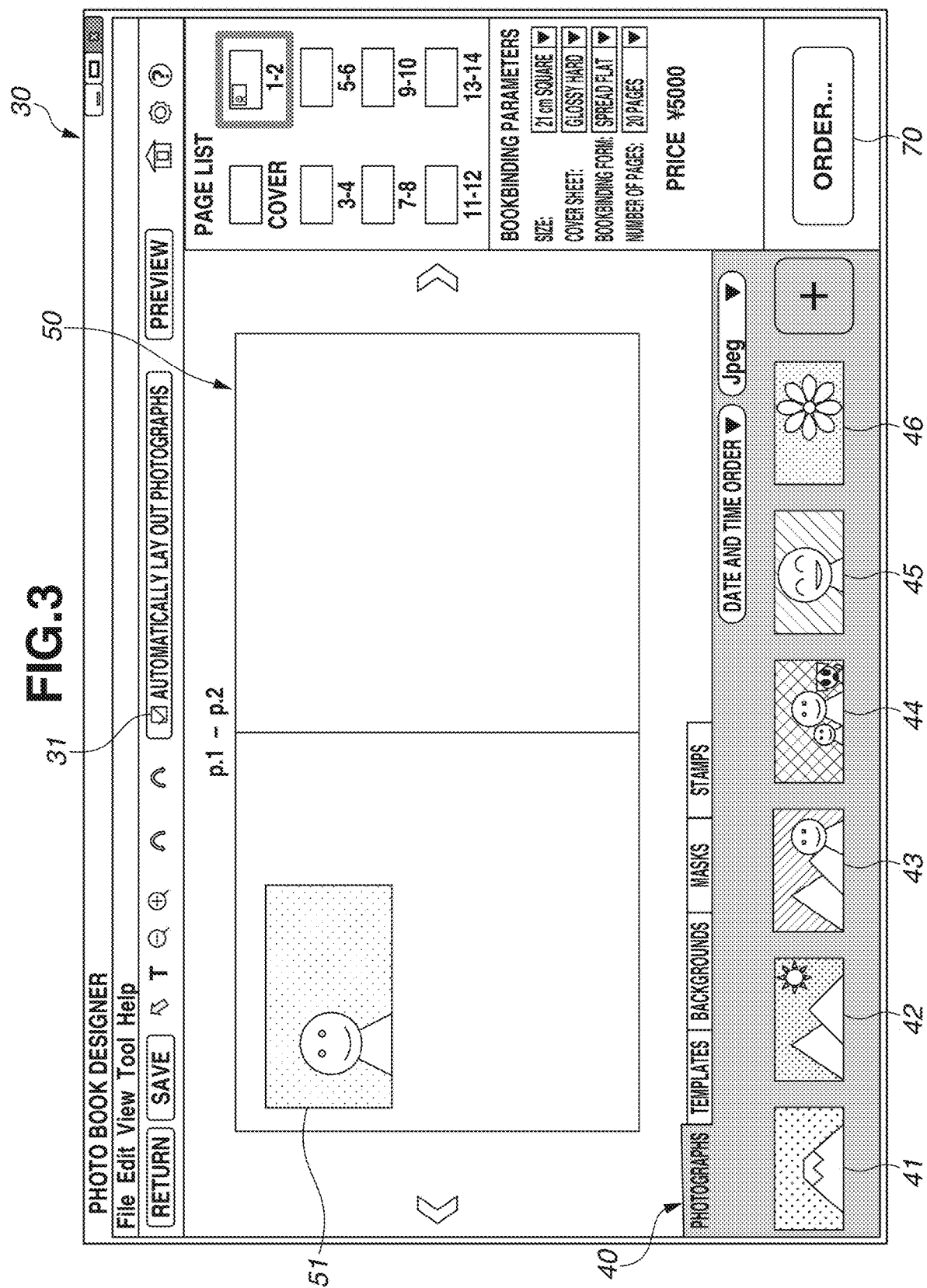

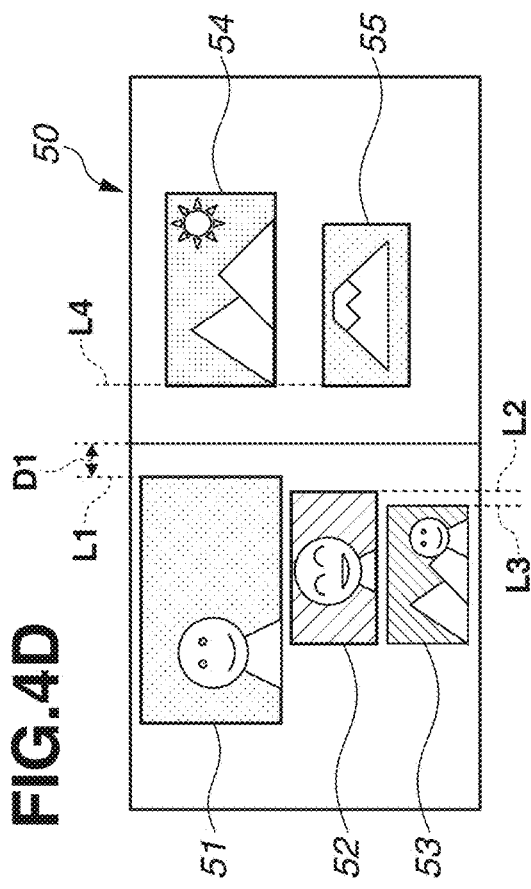
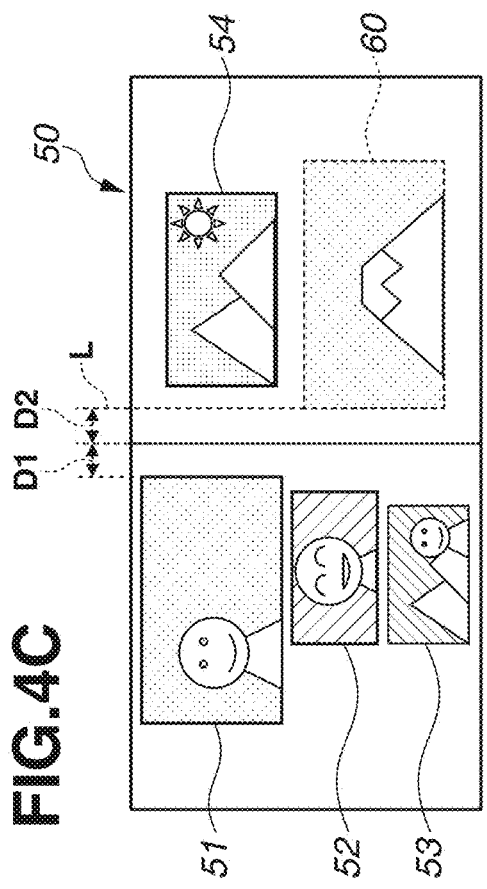
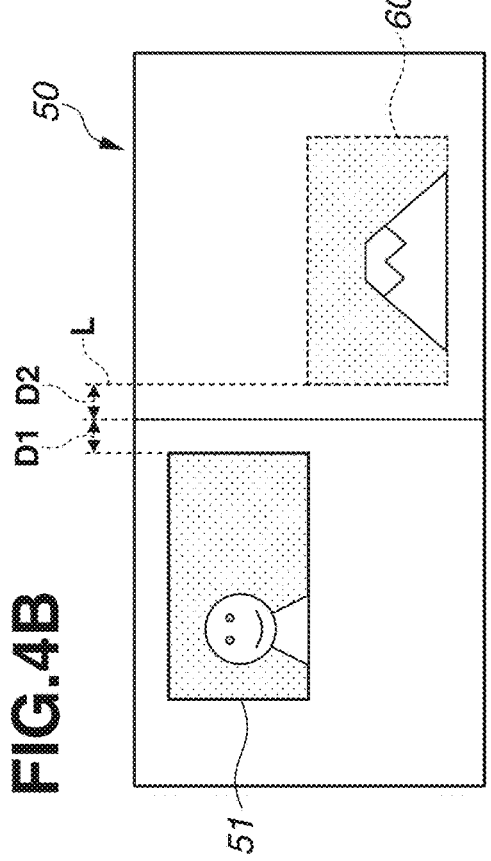

INFORMATION PROCESSING APPARATUS, CONTROL METHOD, AND STORAGE MEDIUM

BACKGROUND

Field

The present disclosure relates to an information processing apparatus, a control method, and a storage medium.

Description of the Related Art

Presentation material creation software or computer aided design (CAD) software includes a function of object snapping. This function improves user operability in object layout processing (Japanese Patent Application Laid-Open No. 2010-176275).

In the object snapping function, however, as a number of objects that have already been laid out increases, a number of candidates of a position where a new object is automatically laid out increases. As a result, layout processing unintended by a user may be performed by the object snapping function.

SUMMARY

According to an aspect of the present disclosure, an information processing apparatus to perform an object snapping function of laying out a new object in a spread page area by automatically aligning a position of the new object with respect to a layout position of an object already laid out in the spread page area includes a selection unit configured to select an object as a selected object, a switching unit configured to switch enabling and disabling of the object snapping function based on a user operation, a layout unit configured to lay out the selected object in the spread page area by using the object snapping function in a case where the object snapping function is enabled, and an output unit configured to output album data including the spread page area in which the selected object is laid out.

Further features of the present disclosure will become apparent from the following description of exemplary embodiments with reference to the attached drawings.

BRIEF DESCRIPTION OF THE DRAWINGS

FIG. 3 is a diagram illustrating an example of an edit screen.

FIGS. 4A to 4D are diagrams each illustrating an example of the edit screen.

DESCRIPTION OF THE EMBODIMENTS

Figure 5:
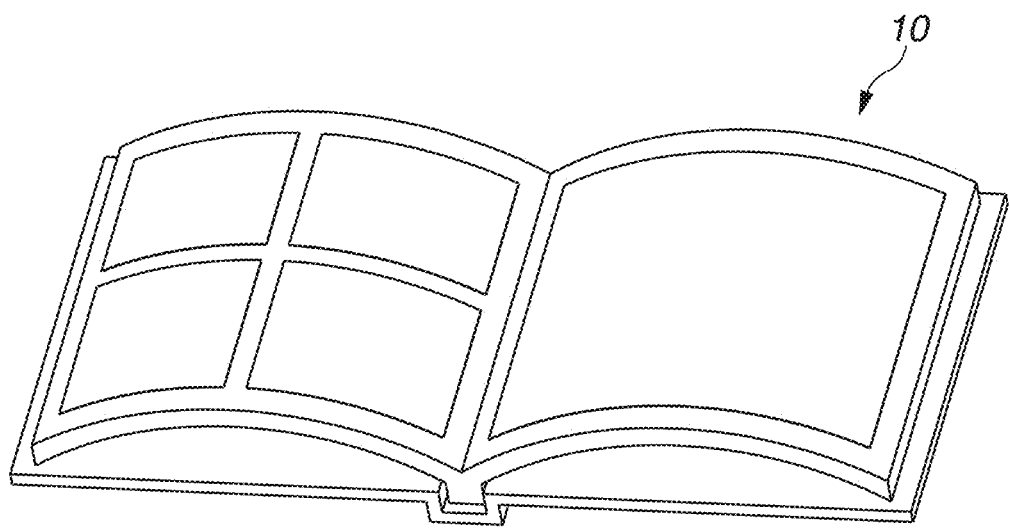
FIG. 5 is a diagram illustrating a schematic example of an album.
Figure 6:
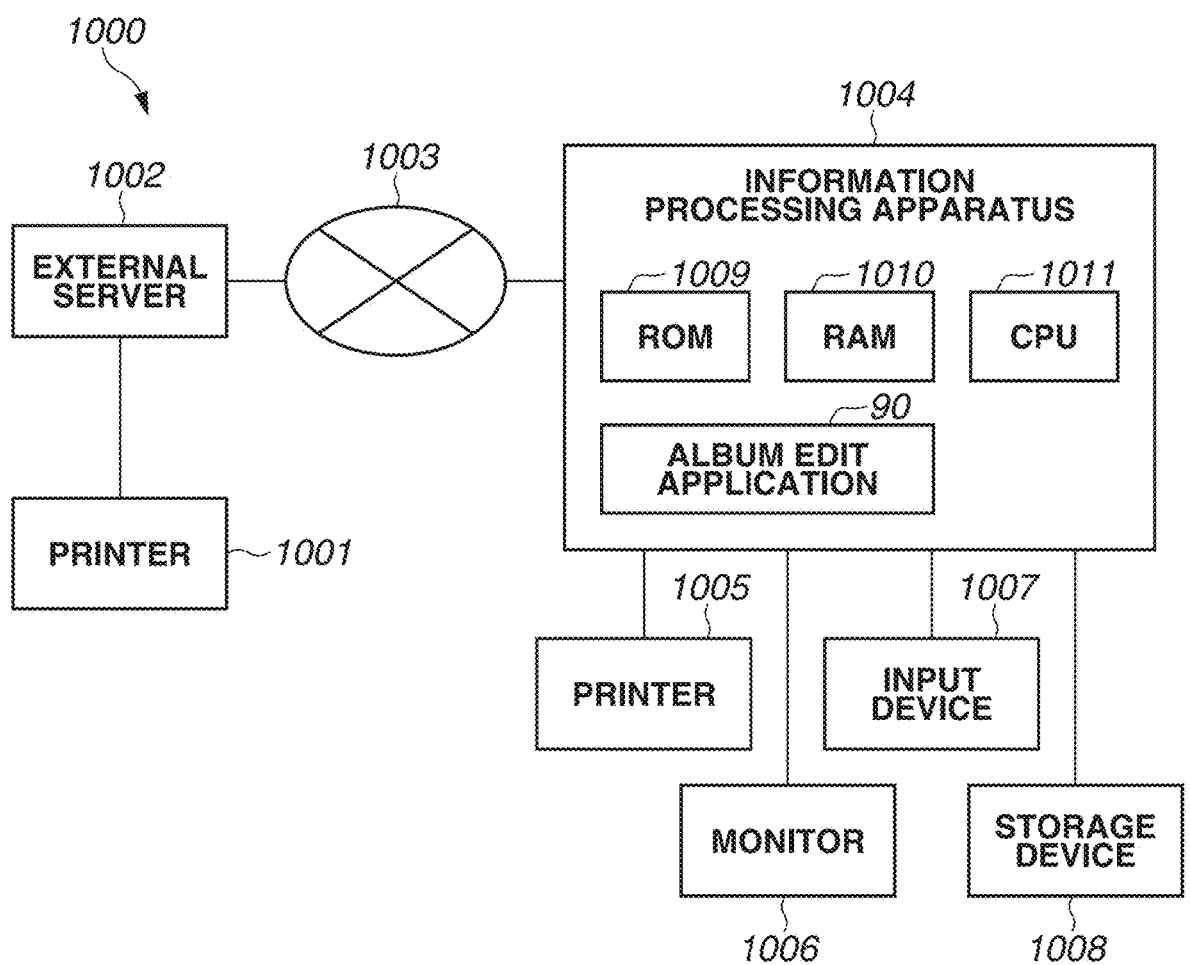
FIG. 6 is a diagram illustrating an example of a configuration of a printing system.

FIG. 6 is a configuration diagram of a printing system 1000 according to a first exemplary embodiment. First, a configuration of an information processing apparatus 1004 according to the present exemplary embodiment will be described. An album edit application 90 is stored in a read-only memory (ROM) 1009 included in the information processing apparatus 1004. The album edit application 90 creates album data, which is used to create an album 10 (e.g., photo album, and photo book) as illustrated in FIG. 5, using input image data. The information processing apparatus 1004 outputs the album data as print data to a printer 1005, and uploads the album data to an external server 1002. The information processing apparatus 1004 includes the ROM 1009, a random access memory (RAM) 1010, and a central processing unit (CPU) 1011. The information processing apparatus 1004 is connected with the printer 1005, a monitor 1006, an input device 1007, and a storage device 1008. The information processing apparatus 1004 also includes an input/output interface (not illustrated) to connect with a network 1003. The album data includes a plurality of pieces of spread page data. In the spread page data, image data is arranged.

The CPU 1011 executes an operation system program (hereinafter, referred to as OS) stored in the storage device 1008, the ROM 1009, or the RAM 1010 to control the information processing apparatus 1004 entirely. The CPU 1011 also executes programs stored in the ROM 1009 and/or the RAM 1010 to perform functions of the information processing apparatus 1004. The ROM 1009 stores programs. The RAM 1010 is used as a work memory for the CPU 1011. In a case where the RAM 1011 is a nonvolatile RAM, programs may be stored in the RAM 1010.

The information processing apparatus 1004 can communicate with the external server 1002 through the network 1003. The external server 1002 includes an input/output interface (not illustrated) to connect with a printer 1001, and communicates with the printer 1001 via the input/output interface.

The album data created with the information processing apparatus 1004 is uploaded to the external server 1002 through the network 1003. The external server 1002 transmits print data based on the uploaded album data to the printer 1001. For example, the external server 1002 receives orders of album creation, manages orders of album creation, and creates print data based on the album data to instruct printing. A user uploads the album data created with the information processing apparatus 1004 to the external server 1002, and performs album purchasing procedure. When the user operation has been appropriately performed, the external server 1002 transmits the print data based on the album data to the printer 1001. Thereafter, a printed product printed by the printer 1001 is bound to create the album 10 as illustrated in FIG. 5, and the album 10 is delivered to the user.

The printer 1005 prints the print data based on the album data created by the information processing apparatus 1004. For example, a printed material printed by the printer 1005 is bound by the user. The monitor 1006 is a display device that displays image information output from the information processing apparatus 1004. The input device 1007 is an input device, such as a keyboard and a pointing device, for inputting to the information processing apparatus 1004. Depending on a configuration of the input device, the input device may be integrated with a monitor like a touch panel that receives input through direct touching. The storage device 1008 is a storage device, such as a hard disk drive (HDD) and a solid state drive (SSD), for storing image data or templates. The configuration illustrated in FIG. 6 is illustrative, and the printing system 1000 may have any other configuration. For example, the information processing apparatus 1004 may include the monitor 1006, the input device 1007, and the storage device 1008.

Figure 15A:
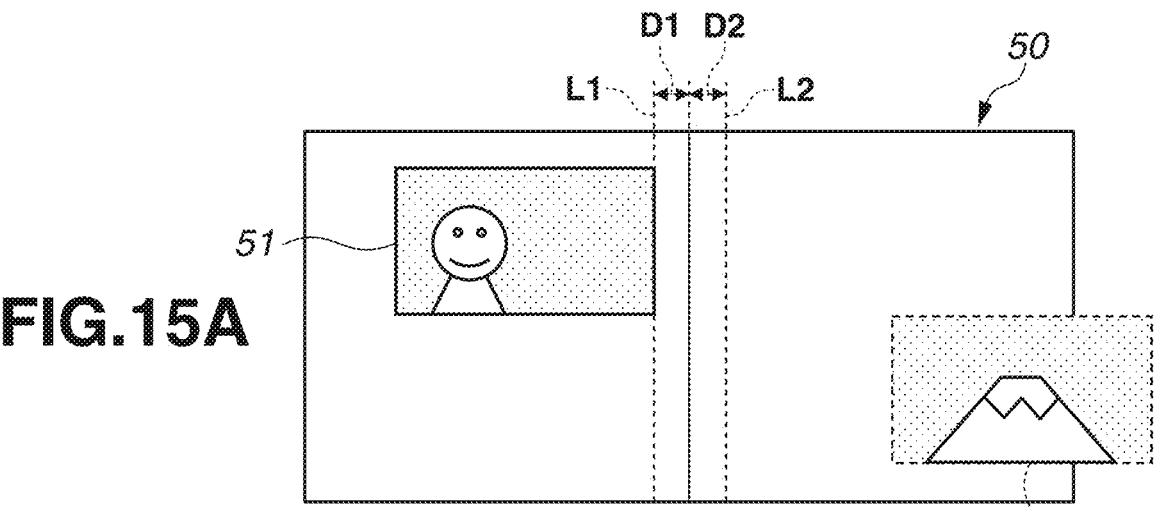
FIGS. 15A to 15C are diagrams illustrating an example of an object snapping function.
Figure 15B:
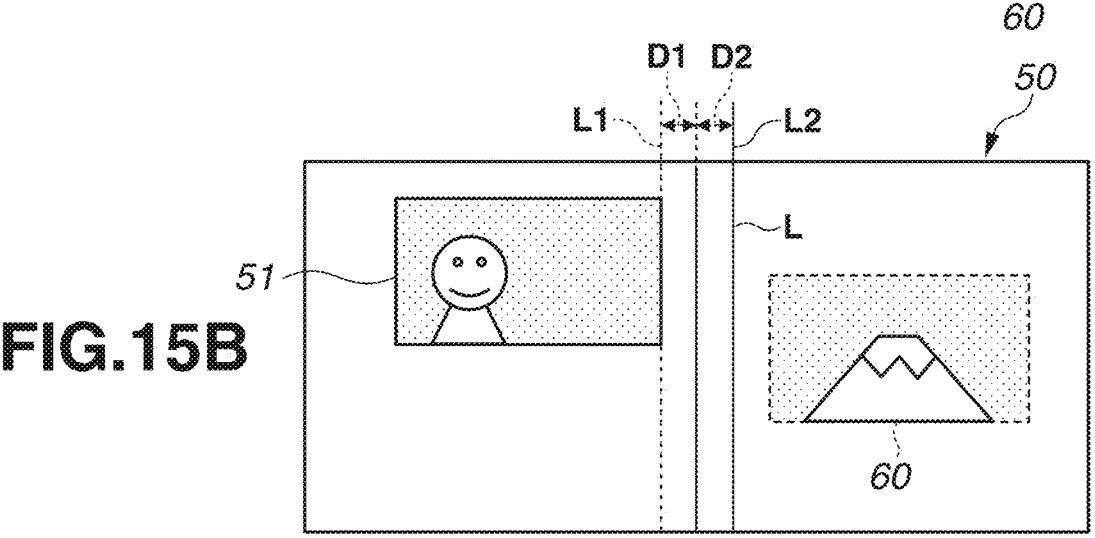
Figure 15C:
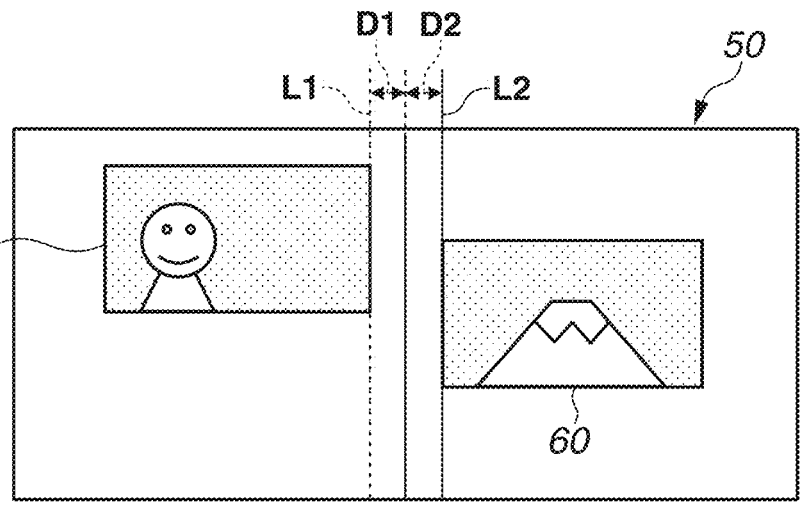

Next, processing according to the present exemplary embodiment will be described with reference to FIG. 1 to FIG. 5 and FIGS. 15A to 15C. First, an object snapping function will be described with reference to FIGS. 15A to 15C. Object snapping is used to automatically determine a layout position of a new object, based on a position where an object that has already been laid out is positioned. When the user lays out the new object, the object snapping function enables the user to easily align positional relationship between the object already laid out and the new object. An example will be described. For example, in a state where image data 51 is already laid out as illustrated in FIG. 15A, the user performs drag operation to lay out new image data 60 in a spread page area 50. In the state of FIG. 15A, a reference line L1 for the object snapping function is set at a position separated by a distance D1 from a binding position with reference to the image data 51 already laid out. Further, a reference line L2 for the object snapping function is set also at a position (separated by distance D2=D1 from binding position) line-symmetric with respect to the binding position. In this state, if the new image data 60 is dragged within a predetermined distance from at least one of the reference lines L1 and L2 as illustrated in FIG. 15B, a guideline L is displayed. In FIG. 15B, since the new image data 60 is dragged within the predetermined range from the reference line L2, the guideline L is displayed on the reference line L2. In other words, the CPU 1011 performs display control processing to display the guideline. When the user performs drop operation of the image data 60 in the state of FIG. 15B, the image data 60 is automatically laid out along the guideline L as illustrated in FIG. 15C. As described above, the album edit application 90 is software that performs the object snapping function.

Figure 1:
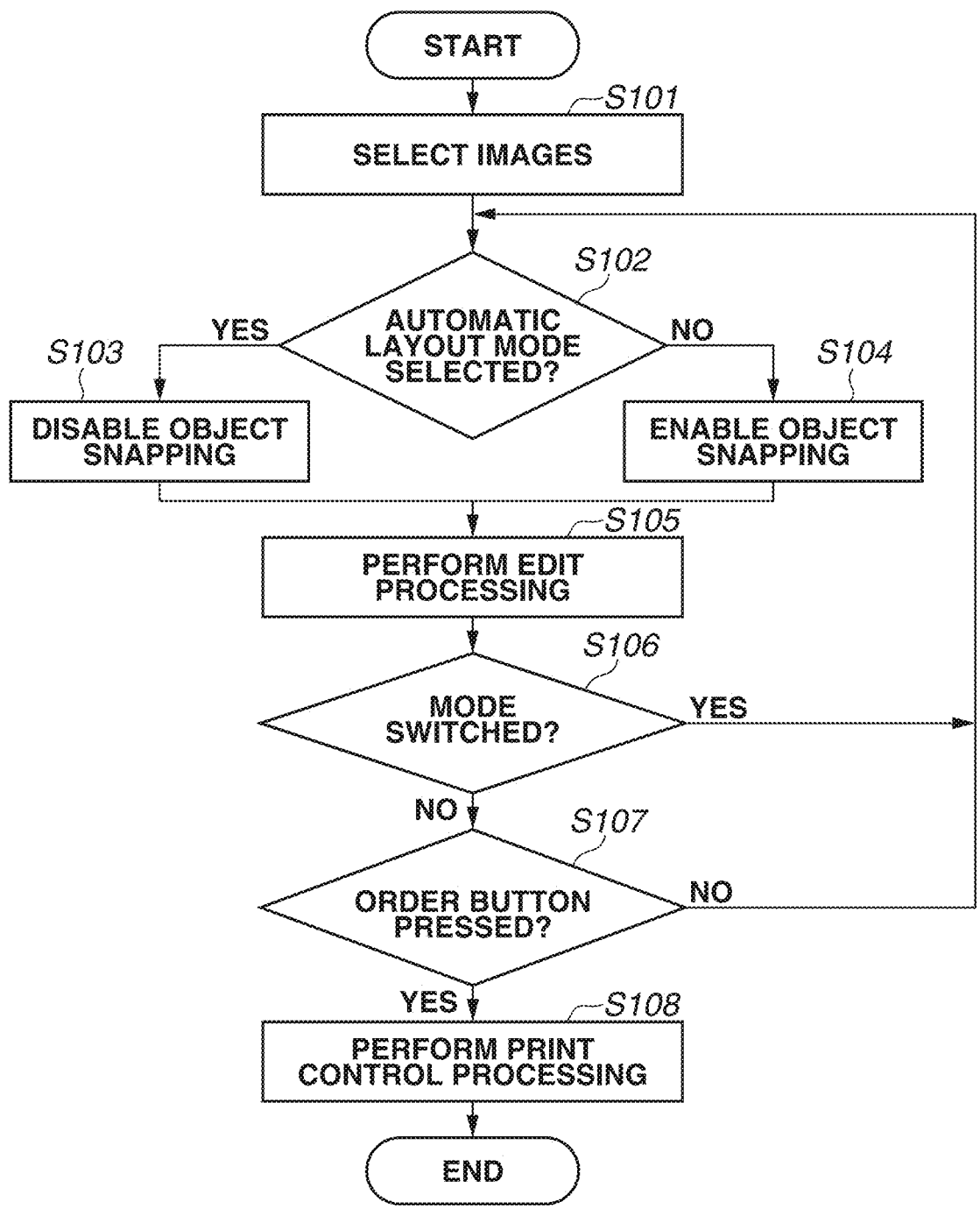
FIG. 1 is a flowchart illustrating processing according to a first exemplary embodiment.

Next, the processing according to the present exemplary embodiment is described with reference to a flowchart illustrated in FIG. 1. When the user starts up the album edit application 90, the processing in FIG. 1 starts. When the album edit application 90 is started up, the user sets a size of an album, a type of a cover sheet, a bookbinding form, and a number of pages of the whole album. The values set at this time are displayed as initial values of bookbinding parameters illustrated in FIG. 3. These parameters can be changed during editing, and a price can also be changed based on the change of the bookbinding parameters. After the setting operation, a folder selection screen (described below) is displayed. Steps illustrated in the flowchart according to the present exemplary embodiment are realized when the CPU 1011 reads out programs relating to the processing of the flowchart from the memories, and executes the programs.

In step S101, the CPU 1011 receives selection of image data from the user. When the album edit application 90 is started up, the folder selection screen is displayed. If the user selects a desired folder, a screen of a list of image data stored in the selected folder is displayed. Thus, the CPU 1011 performs the processing illustrated in step S101 when the user selects image data by using the screen of the list.

Figure 2:
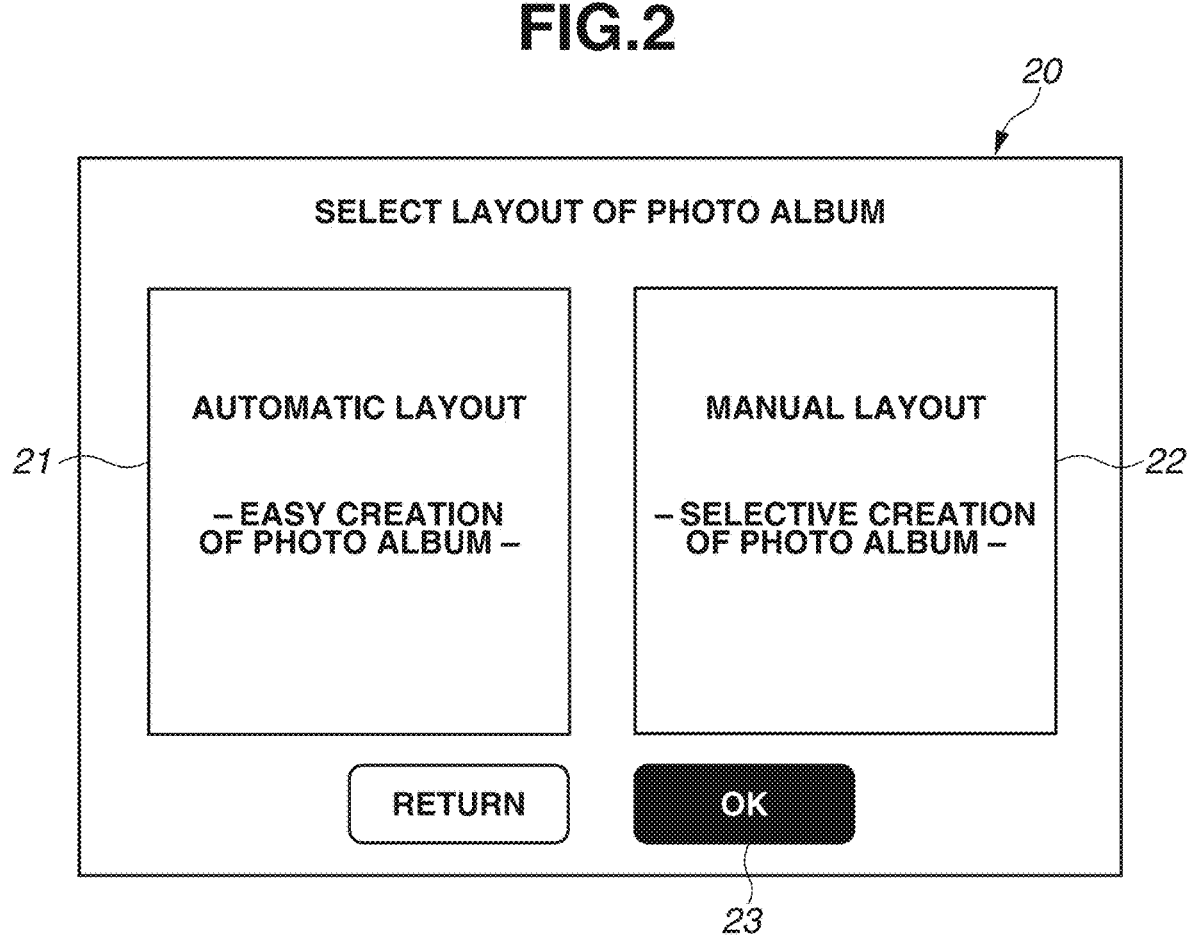
FIG. 2 is a diagram illustrating an example of a layout mode selection screen.

After completion of the processing performed in step S101, the CPU 1011 determines in step S102 whether an automatic layout mode has been selected as a layout mode. After completion of the processing in step S101, a screen in FIG. 2 is displayed by the album edit application 90. The CPU 1011 determines whether the user has selected automatic layout 21 or manual layout 22.

In a case where it is determined in step S102 that the automatic layout mode has been selected (YES in step S102), the processing proceeds to step S103. In step S103, the CPU 1011 disables the object snapping function. The CPU 101 evaluates the image data selected in step S101 by using the album edit application 90, and scores each of the image data. Based on the scores for each of the image data, image data to be laid out in the album data is selected. The CPU 1011 lays out the selected image data in the spread page area 50. In the case where the automatic layout mode is selected, automatic layout processing of the image data is performed by the album edit application 90. In the automatic layout processing, processing to determine a spread page where the image data is laid out and processing to determine a size of the image data are automatically performed. In the case where the automatic layout mode is selected, all of pieces of the image data selected in step S101 are laid out in any of spread pages.

In a case where it is determined in step S102 that the manual layout mode has been selected (NO in step S102), the processing proceeds to step S104. In step S104, the CPU 1011 enables the object snapping function. In the case where the manual layout mode is selected, the following processing are performed by a user operation: selection of image data to be laid out in the album data, the processing to determine the spread page where the image data is laid out, and the processing to determine the size of the image data. In the case where the manual layout mode is selected, only images selected by the user from the image data selected in step S101 are laid out in the spread pages. Subsequently, after completion of the processing performed in step S103 or S104, the processing proceeds to step S105. In step S105, the CPU 1011 performs edit processing. In a case where the processing in step S105 is performed through the processing in step S103, the CPU 1011 displays an edit screen 30 including spread pages where the image data has been already laid out. In contrast, in a case where the processing in step S105 is performed through the processing in step S104, an edit screen illustrated in FIG. 3 is displayed. In a case where the processing in step S105 is performed through the processing in step S104 and the edit screen 30 is first displayed, no image data has been laid out in the spread page area 50. Further, the edit screen 30 is provided by the album edit application 90.

The edit screen 30 includes a checkbox 31 for switching of the layout mode, and an order button 70. The edit screen 30 further includes an image selection area 40. The check box 31 receives selection whether to perform the automatic layout or the manual layout.

In the image selection area 40, a plurality of pieces of image data 41 to 46 selected in step S101 are displayed. The edit screen 30 further includes the spread page area 50 of the album. FIG. 3 illustrates a result when the user lays out the image data 51 in the spread page area 50 of the edit screen 30 in an initial state.

FIGS. 4A to 4D illustrate a case where the image data 60 is newly added to the spread page area 50 where the image data 51 has been already laid out. FIG. 4A illustrates a case where the object snapping function is disabled, and FIG. 4B illustrates a case where the object snapping function is enabled.

Since the object snapping function is disabled, the guideline is not displayed in the edit screen 30 as illustrated in FIG. 4A. Since the CPU 1011 operates in the automatic layout mode, the CPU 1011 performs the automatic layout processing based on the drop operation by the user, and determines a position where the image data 60 is laid out.

FIG. 4B illustrates an example of the edit screen used in the manual layout mode. In the manual layout mode, the object snapping function is enabled. Thereby, when the user drags the new image data 60 to lay out the new image data 60 in the spread page, the guideline L as an indicator mark for layout of the new image data 60 is displayed. In FIG. 4B, the guideline L is displayed such that a space of the distance D1 and a space of the distance D2 from a binding portion at a center of the album become identical blank spaces, and thereby assisting layout operation for the user.

The setting of the layout mode can be switched not only in the above-described layout mode selection screen 20 but also in the middle of editing. In other words, the user can instruct switching of the layout mode by switching the state of the checkbox 31 included in the edit screen 30. In step S106, the CPU 1011 determines whether contents of the checkbox 31 have been changed. For example, in the case where the automatic layout 21 is selected in FIG. 2, the checkbox 31 is checked. If the user unchecks the checkbox 31, the CPU 1011 determines that the mode has been changed from the automatic layout mode to the manual layout mode, and performs processing in and after step S105 through step S104.

For example, in the case where the manual layout 22 is selected in FIG. 2, the checkbox 31 is unchecked. If the user checks the checkbox 31, the CPU 1011 determines that the mode has been changed from the manual layout mode to the automatic layout mode, and performs the processing in and after step S105 through step S103. When the mode is changed from the manual layout mode to the automatic layout mode, the CPU 1011 performs the automatic layout processing on newly laid out image data. In this case, the guideline is not displayed, and the object snapping function is disabled. Further, the image data is not automatically selected.

In step S107, the CPU 1011 determines whether the order button 70 has been pressed. In a case where it is determined that the order button 70 has been pressed (YES in step S107), the processing proceeds to step S108. In step S108, the CPU 1011 performs print control processing. As an example of the processing performed in step S108, the CPU 1011 transmits the created album data to the external server 1002 through the network 1003, and instructs printing. In a case where a screen relating to payment is displayed and input of appropriate information is confirmed, the album data may be transmitted to the external server 1002. The edit screen 30 may also be provided with a print button in place of the order button. In a case where the print button is pressed, the processing performed in step S108 is executed.

In the case where the print button is pressed, the CPU 1011 creates, as the print control processing, print data based on the album data and transmits the print data to the printer 1005.

In the case where the order button 70 (or print button) is pressed, the CPU 1011 determines whether a spread page where no image data is laid out is present. In a case where it is determined that the spread page where no image data is laid out is present, the CPU 1011 displays an error message. At this time, the CPU 1011 may display the spread page where no image data is laid out, on the edit screen 30.

Further, switching between enabling and disabling of the object snapping function can be performed depending on a type of the object to be laid out. For example, in the case where the user selects the manual layout mode, the object snapping function is enabled. At this time, when the user tries to lay out the image data in the spread page area 50, the object snapping function is performed. In contrast, when the user tries to lay out another object (e.g., stamp image) other than the image data in the spread page area 50 in the state where the object snapping function is enabled, the object snapping function is temporarily disabled. Thereafter, the other object is manually laid out in the spread page area 50 by the user.

As described above, in the present exemplary embodiment, enabling and disabling of the object snapping function are switched depending on the set layout mode. Accordingly, utilization of the object snapping function only when necessary makes it possible to create the album with unity, and to improve operability in parallel.

Figure 7:
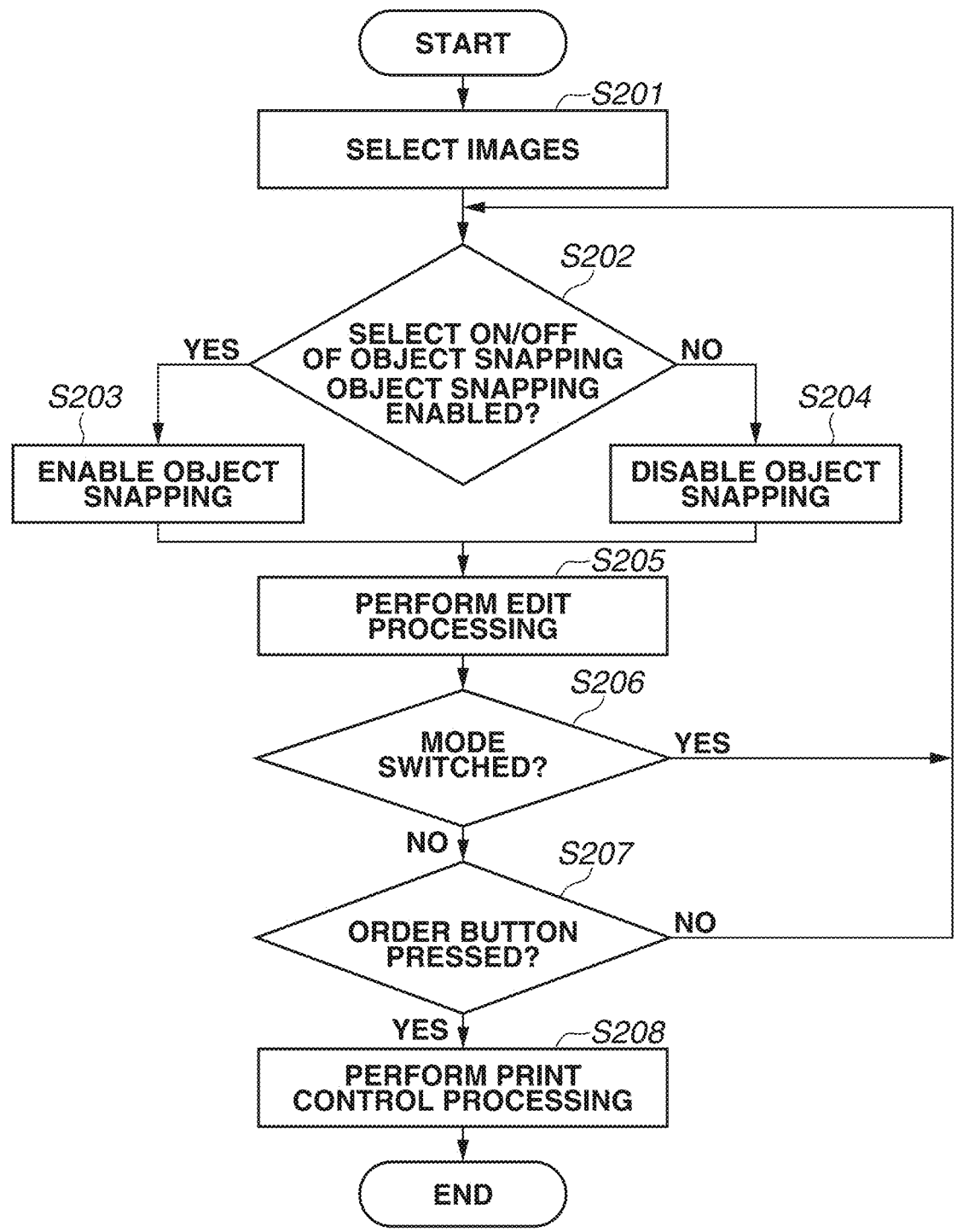
FIG. 7 is a flowchart illustrating processing according to a second exemplary embodiment.

Next, a second exemplary embodiment is described. The present exemplary embodiment is different in the method of switching enabling and disabling of an object snapping function from the first exemplary embodiment. More specifically, in the first exemplary embodiment, enabling and disabling of the object snapping function are switched depending on whether the selected mode is the automatic layout mode. In contrast, in the second exemplary embodiment, enabling and disabling of the object snapping function are switched by receiving input to a checkbox 32 illustrated in FIG. 8. In the second exemplary embodiment, the manual layout mode is enabled. The present exemplary embodiment is described below with reference to a flowchart illustrated in FIG. 7 and FIG. 8. Steps in the flowchart according to the present exemplary embodiment are realized when the CPU 1011 reads out programs that are related to the processing of the flowchart from the memories, and executes the programs.

Figure 8:
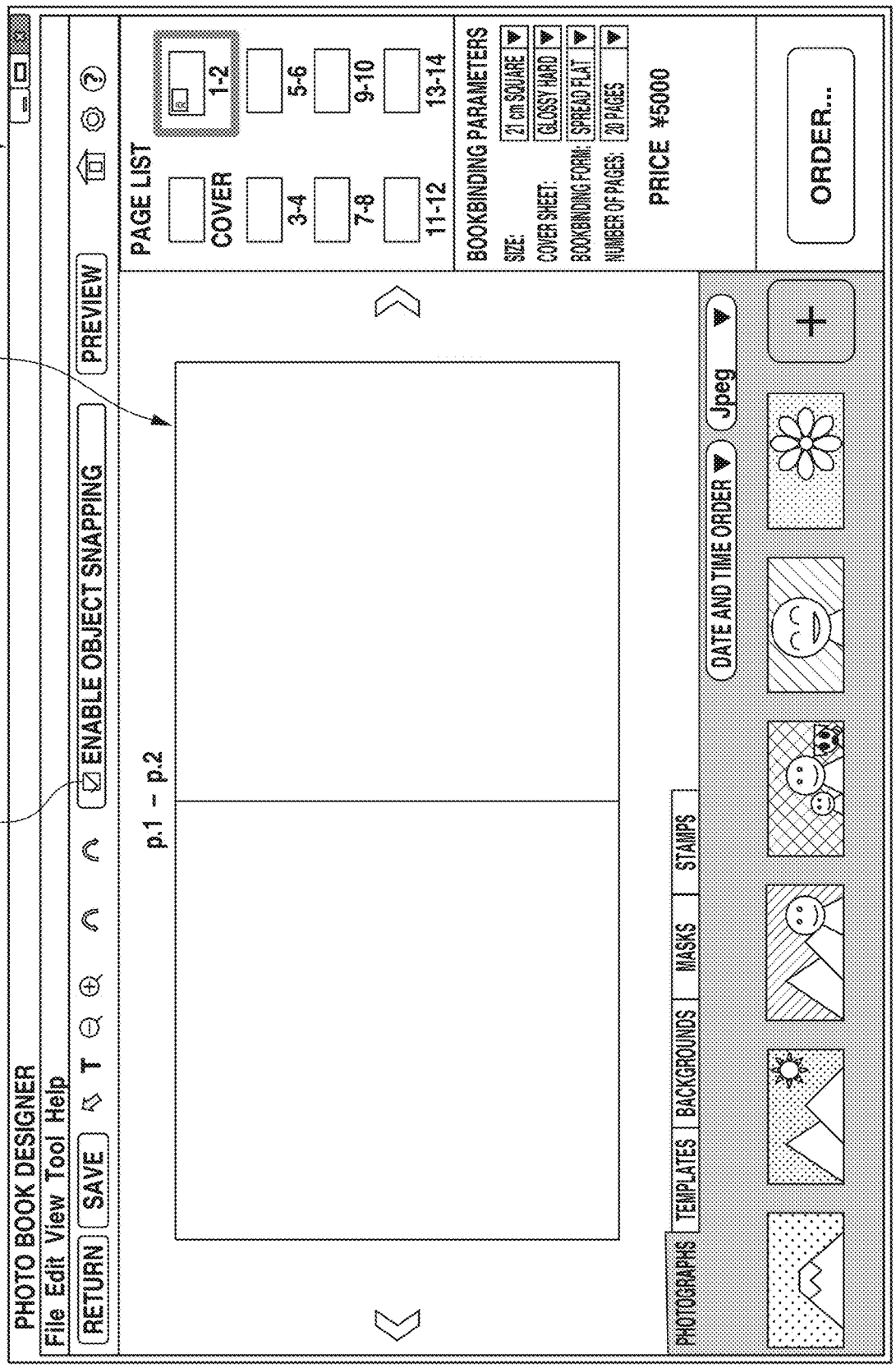
FIG. 8 is a diagram illustrating an example of the edit screen.

In step S201, the CPU 1011 receives selection of image data from the user, Since processing performed in step S201 is the same as the processing performed in step S101, detailed description of the processing is omitted. After completion of the processing in step S201, the CPU 1011 displays a screen illustrated in FIG. 8. In the screen of FIG. 8, the checkbox 32 that receives switching of enabling and disabling of the object snapping function is displayed.

In step S202, the CPU 1011 determines whether an object snapping mode has been enabled. More specifically, in a case where the checkbox 32 has been checked, the CPU 1011 determines that the object snapping mode has been enabled. In contrast, in a case where the checkbox 32 has not been checked, the CPU 1011 determines that the object snapping mode has not been enabled.

In a case where a determination result is YES in step S202 (YES in step S202), the processing proceeds to step S203 and S205. In step S203, the CPU 1011 enables the object snapping mode, and then, in step S205, performs the edit processing. The processing in step S205 performed through the processing in step S203 is the same as the processing in step S105 performed through the processing in step S104 in FIG. 1.

In contrast, in a case where the determination result is NO (NO in step S202), the processing proceeds to step S204 and S205. In step S204, the CPU 1011 disables the object snapping mode, and then, in step S205, performs the edit processing. Accordingly, even when the user performs operation to lay out new image data to the edit screen, the guideline is not displayed, and the object snapping function is not performed.

In step S206, the CPU 1011 determines whether the object snapping mode has been switched. More specifically, the CPU 1011 determines whether the state of the checkbox 32 has been changed, to realize the processing in step S206. Since processing in and after step S207 is the same as the processing in and after step S107 in FIG. 1, detailed description of the processing is omitted.

According to the present exemplary embodiment, the user can switch enabling and disabling of the object snapping mode during the editing in the manual layout mode. For example, the user enables the object snapping mode in a state there the number of pieces of image data to be laid out in the spread pages is small. Thereafter, when the number of pieces of image data to be laid out in the spread pages is increased and the user feels troublesome to the guide display, the user can uncheck the checkbox 32 to improve operability.

Figure 9:
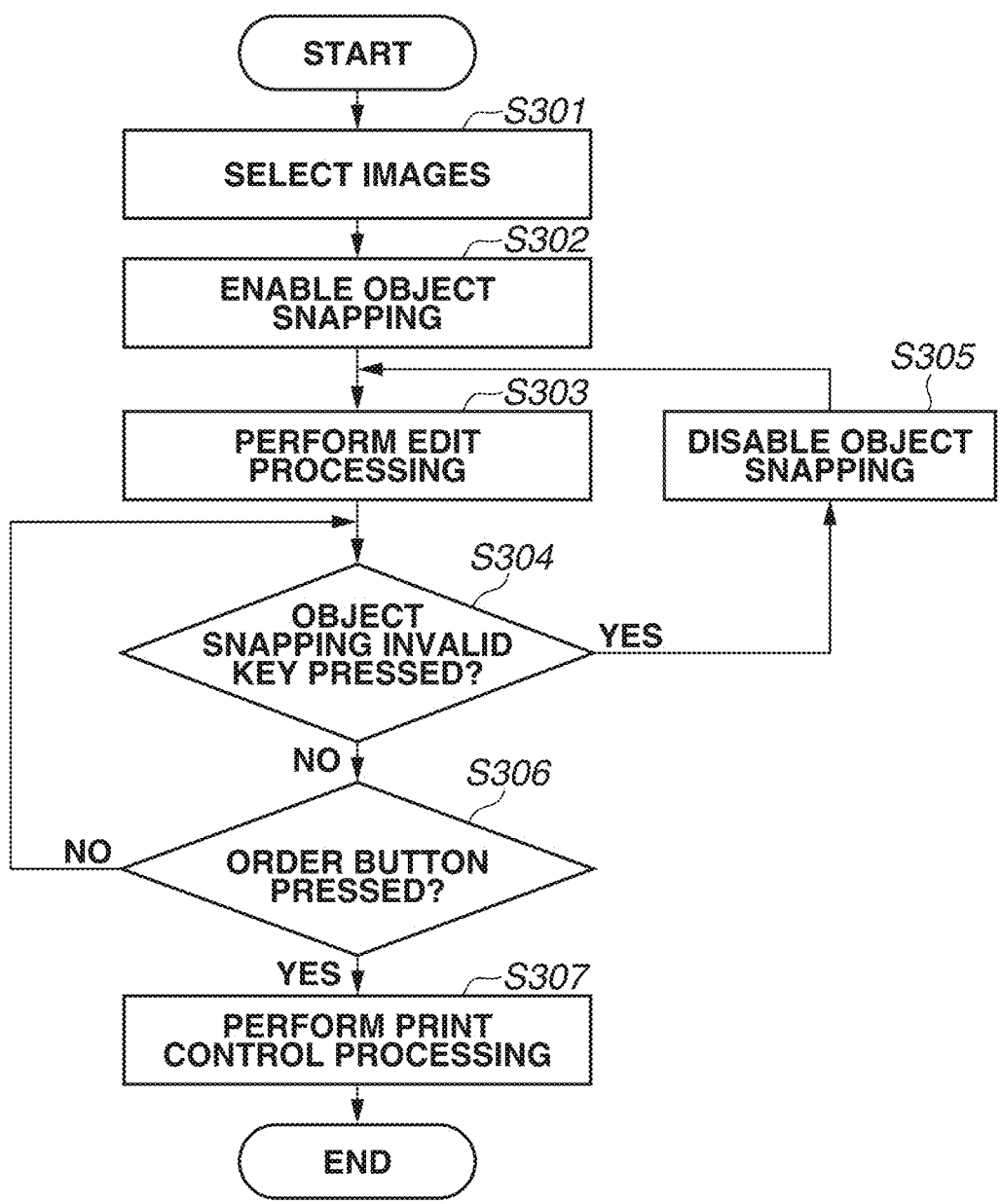
FIG. 9 is a flowchart illustrating processing according to a third exemplary embodiment.

Next, a third exemplary embodiment according to the present disclosure will be described. In the third exemplary embodiment, the manual layout mode is enabled. The present exemplary embodiment is different in a method of switching enabling and disabling of the object snapping function from the above-described exemplary embodiments. More specifically, the object snapping mode is disabled only while an invalid key is pressed. The present exemplary embodiment is described below with reference to a flowchart illustrated in FIG. 9. Steps in the flowchart according to the present exemplary embodiment are realized when the CPU 1011 reads out programs that are related to the processing of the flowchart from the memories, and executes the programs.

Figure 10:
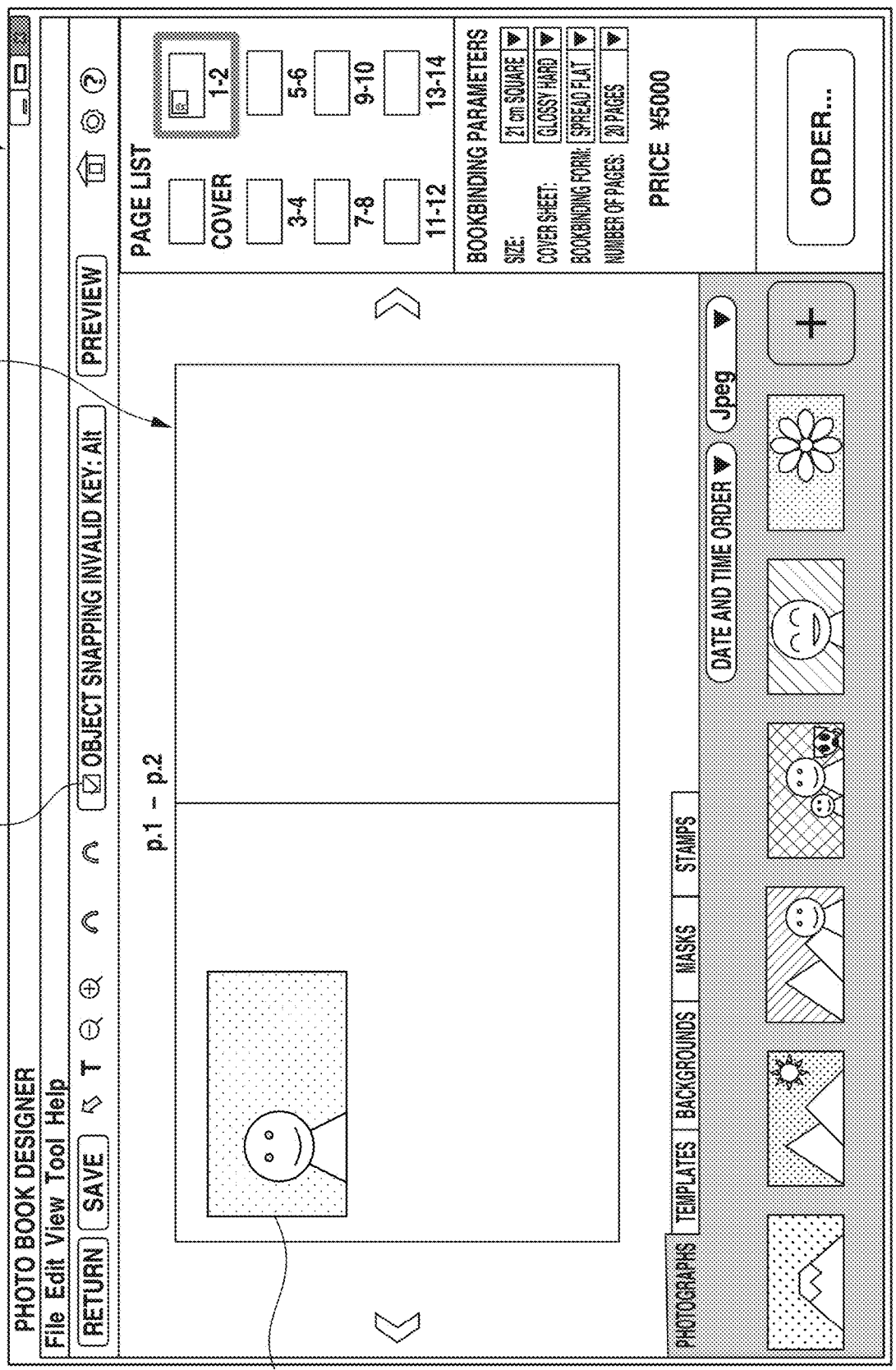
FIG. 10 is a diagram illustrating an example of the edit screen.
Figure 11:
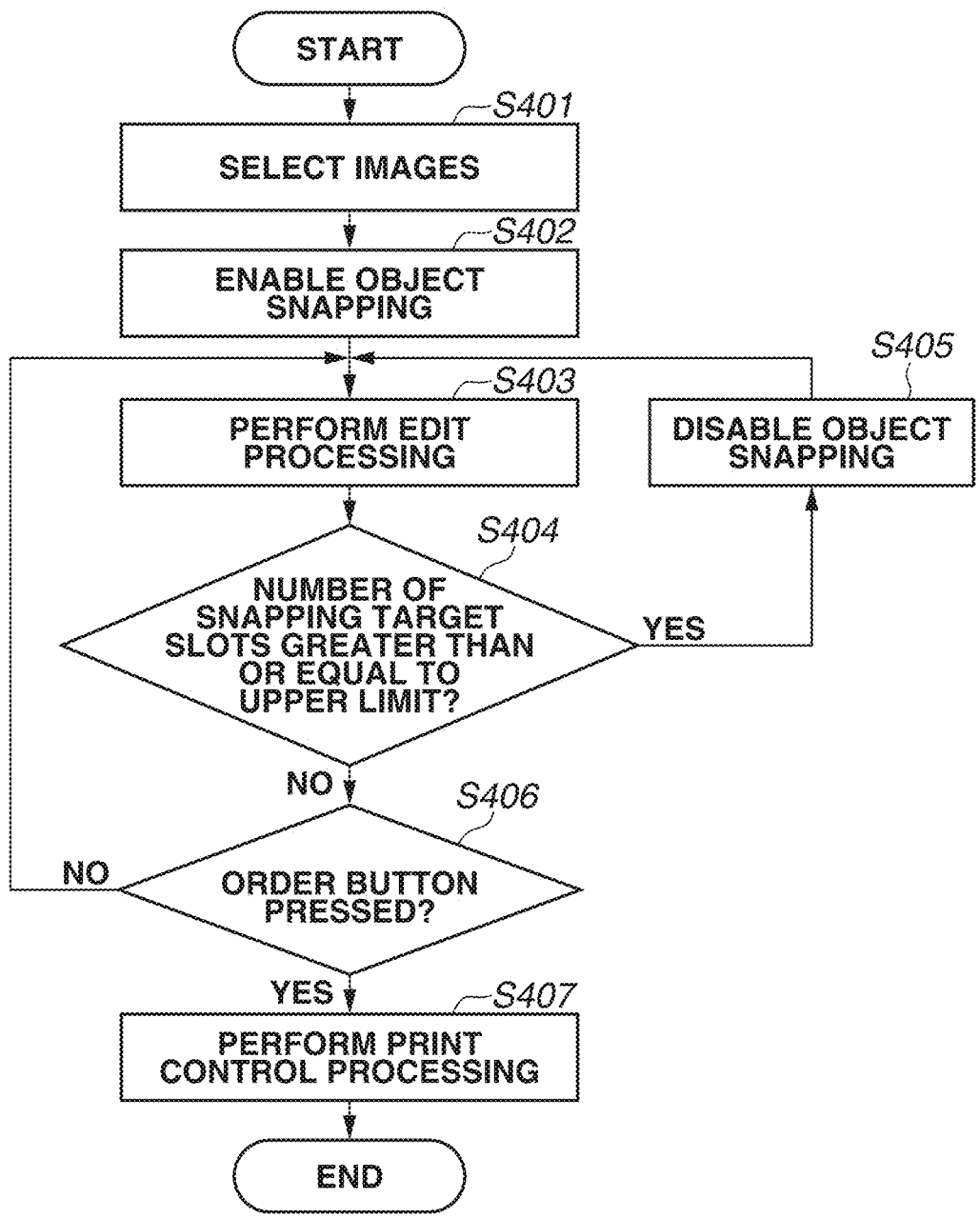
FIG. 11 is a flowchart illustrating processing according to a fourth exemplary embodiment.

In step S301, the CPU 1011 receives selection of image data from the user. Since processing performed in step S301 is the same as the processing performed in step S101, detailed description of the processing is omitted. After completion of the step S301, the CPU 1011 enables the object snapping mode in step S302, and displays the edit screen 30. For example, as illustrated in FIG. 10, the edit screen 30 is displayed in a state where a checkbox 33 is checked. In step S303, the CPU 1011 performs edit processing on the album data based on operation performed on the edit screen 30. At this timing, the object snapping mode is enabled. Thus, same processing is performed as the processing in the case where the processing in step S105 is performed through step S104 illustrated in FIG. 1.

In step S304, in a case where the checkbox 33 of the object snapping invalid key has been checked, the CPU 1011 determines whether the invalid key has been pressed. In a case where pressing of the invalid key is detected in step S304 (YES in step S304), the processing proceeds to step S305 and S303. In step S305, the CPU 1011 disables the object snapping mode, and performs the edit processing in step S303. Since the object snapping mode is disabled at this timing, same processing is performed as the processing in the case where the processing in step S205 is performed through step S204 illustrated in FIG. 7. For example, in the present exemplary embodiment, an Alt button is used as the invalid key. Thus, in a case where new image data is added while the Alt button is pressed, the guide display is not performed as illustrated in FIG. 4A, and the object snapping function is also not performed.

The processing in and after step S306 is the same as the processing in and after step S107. Thus, detailed description of the processing is omitted. In the case where the checkbox 33 is unchecked, the CPU 1011 performs the edit processing in the state where the object snapping mode is enabled even when pressing of the invalid key is detected.

As described above, in the present exemplary embodiment, enabling and disabling of the object snapping function is switched based on whether the object snapping invalid key is pressed. Accordingly, the object snapping function can be utilized only when necessary, and it is possible to create the album with unity and to improve operability in parallel.

Next, a fourth exemplary embodiment of the present disclosure will be described. The present exemplary embodiment is different in a method of switching enabling and disabling of the object snapping function from the above-described exemplary embodiments. More specifically, enabling and disabling of the object snapping function are switched based on the number of pieces of image data laid out in the spread page area 50. The present exemplary embodiment is described with reference to a flowchart illustrated in FIG. 11, FIG. 12, and FIGS. 4A to 4D. Steps included in the flowchart according to the present exemplary embodiment are realized when the CPU 1011 reads out programs that are related to the processing of the flowchart from the memories, and executes the programs.

Since processing performed in steps S401 to S403 is the same as the processing performed in steps S301 to S303, detailed description of the processing is omitted. In step S404, the CPU 1011 counts a number of pieces of image data laid out in the spread page area 50, and determines whether a count result exceeds an upper limit. In a case where it is determined that the count result exceeds the upper limit (YES in step S404), the processing proceeds to step S405 and S403. In step S405, the CPU 1011 disables the object snapping mode, and performs the edit processing in step S403. The edit processing in step S403 performed after the processing in step S405 is the same as the edit processing in step S303 performed after the processing in step S305. Since processing in and after step S406 is the same as the processing in and after step S107, the detailed description of the processing is omitted.

Figure 12:
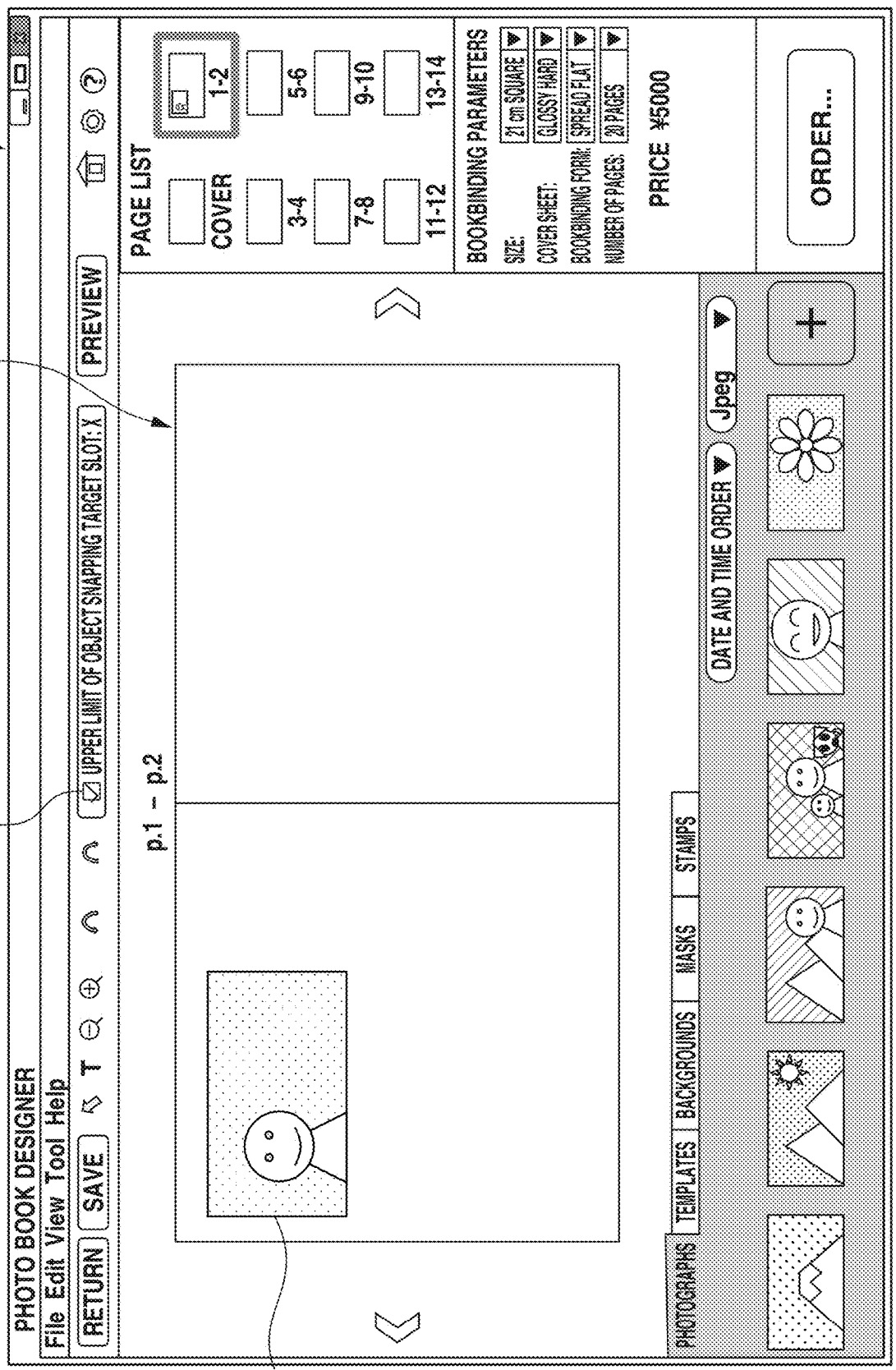
FIG. 12 is a diagram illustrating an example of the edit screen.
Figure 13:
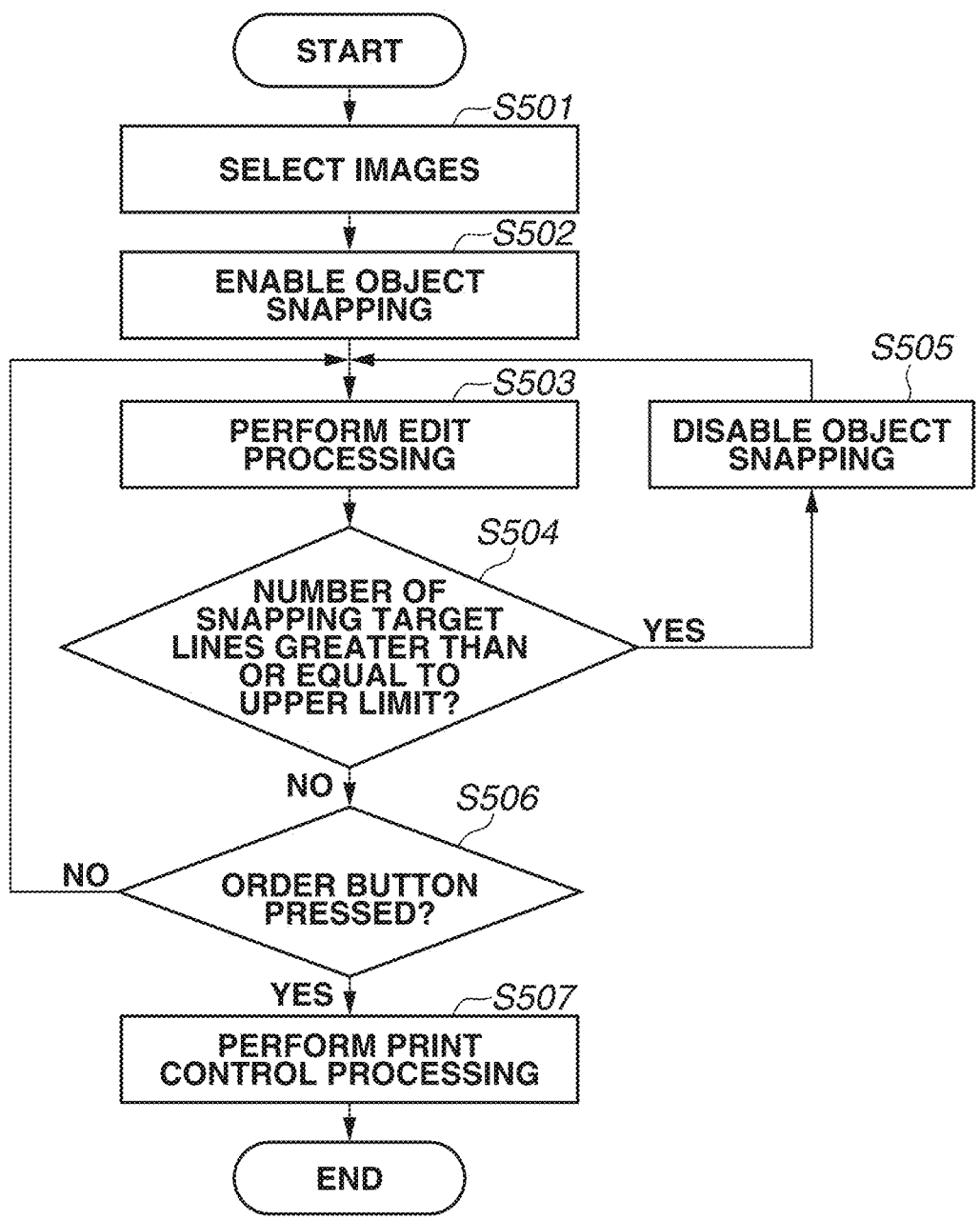
FIG. 13 is a flowchart illustrating processing according to a fifth exemplary embodiment.

A threshold as a reference for switching of enabling and disabling of the object snapping function is set with use of an upper limit setting item 34 illustrated in FIG. 12. For example, in a case where five is set as an upper limit X, the object snapping function is disabled if the number of pieces of image data in the spread page area 50 exceeds five. For example, in a case where the newly-added image data 60 is laid out in a state where four pieces of image data 51 to 54 have been laid out as illustrated in FIG. 4C, the object snapping function is performed. In a case where sixth image data is further added, however, the object snapping function is not performed.

In a case where a checkbox of the upper limit setting item 34 is unchecked, the CPU 1011 performs the edit processing in the state where the object snapping mode is enabled even when the number of pieces of image data exceeds the upper limit.

As described above, in the present exemplary embodiment, enabling and disabling of the object snapping function are switched based on the number of pieces of image data laid out in the spread page area 50. Accordingly, it is possible to easily switch enabling and disabling of the object snapping function.

Next, a fifth exemplary embodiment according to the present disclosure will be described. The present exemplary embodiment is different in a method of switching enabling and disabling of the object snapping function from the above-described exemplary embodiments. More specifically, enabling and disabling of the object snapping function are switched based on the number of reference lines as targets of the object snapping function. The present exemplary embodiment will be described with reference to a flowchart illustrated in FIG. 13, FIG. 14, and FIGS. 4A to 4D. Steps included in the flowchart according to the present exemplary embodiment are realized when the CPU 1011 reads out programs that are related to the processing of the flowchart from the memories, and executes the programs.

Since processing performed in steps S501 to S503 is the same as the processing performed in steps S301 to S303, detailed description of the processing is omitted. In step S504, the CPU 1011 counts a number of reference lines as the targets of the object snapping function from the image data laid out in the spread page area 50, and determines whether a count result exceeds an upper limit. In a case where it is determined that the count result exceeds the upper limit (YES in step S504), the processing proceeds to step S505 and S503. In step S505, the CPU 1011 disables the object snapping mode, and performs the edit processing in step S503. The edit processing in step S503 performed after the processing in step S505 is the same as the edit processing in step S303 performed after the processing in step S305. Since processing in and after step S506 is the same as the processing in and after step S107, the detailed description of the processing is omitted.

Figure 14:
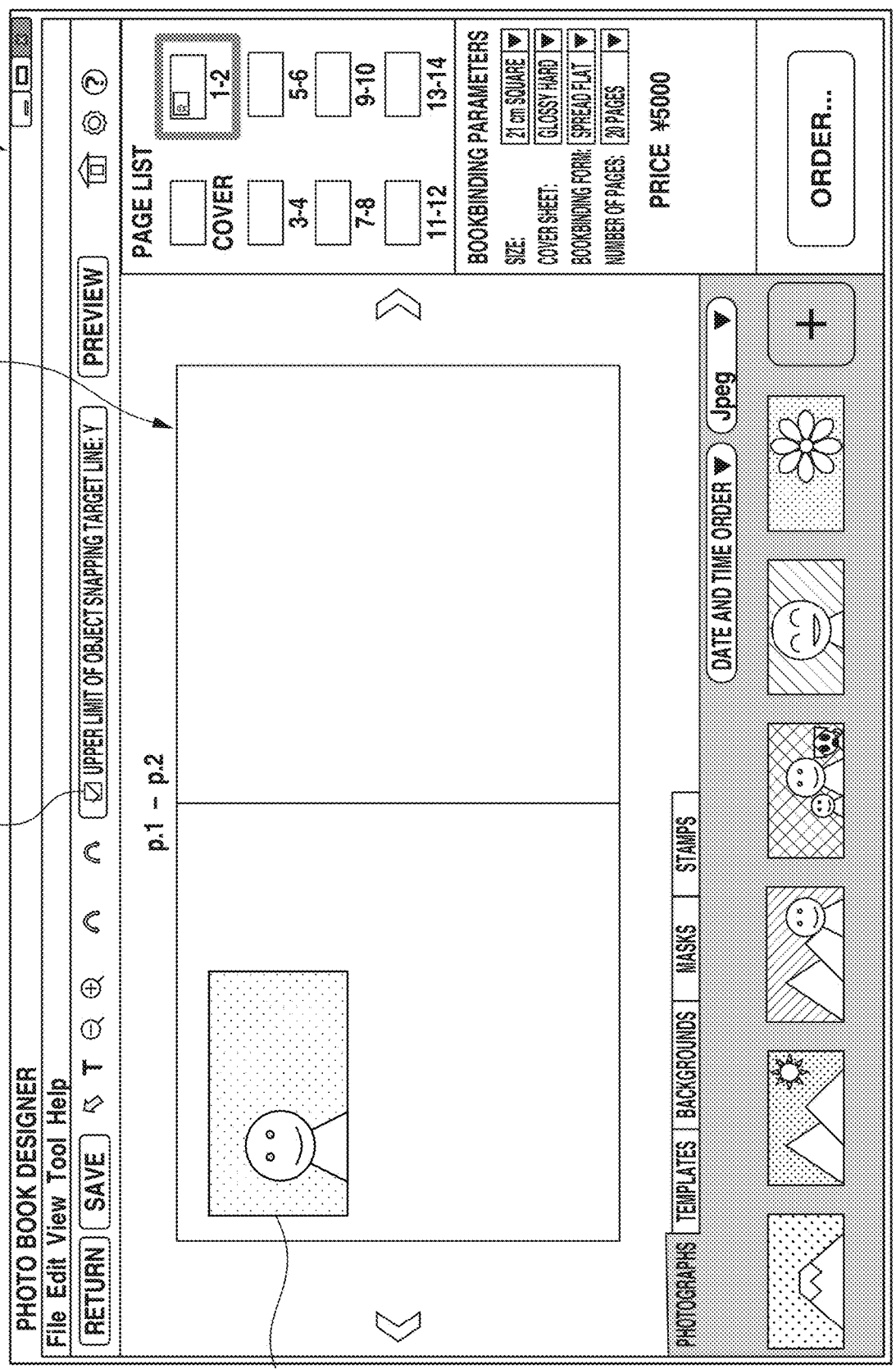
FIG. 14 is a diagram illustrating an example of the edit screen.

A threshold as a reference for switching of enabling and disabling of the object snapping function is set with use of an upper limit setting item 35 illustrated in FIG. 14. For example, in a case where five is set as an upper limit Y, the object snapping function is disabled if the number of reference lines for the object snapping function displayed in the spread page area 50 exceeds five. For example, in a case where five pieces of image data 51 to 55 are laid out as illustrated in FIG. 4D, four lines L1 to L4 are set as the reference lines for the object snapping. In a case where sixth image data is laid out in this state, the guideline is displayed and the object snapping function is performed. In a case where new image data is laid out in a state where the number of reference lines for the object snapping function has reached five, however, the object snapping function is not performed.

As described above, in the present exemplary embodiment, enabling and disabling of the object snapping function are switched based on the number of reference lines as the targets of the object snapping function in the spread page area 50. This makes it possible to easily switch enabling and disabling of the object snapping function.

The album edit application 90 may include all of the functions of the above-described five exemplary embodiments.

The processing in the above-described exemplary embodiments is described as the processing performed using the album edit application 90; however, the processing is not limited thereto. For example, the processing in the above-described exemplary embodiments may be performed using a layout edit application that newly lays out object data.

In the above-described exemplary embodiments, the image data is automatically moved by the object snapping function in the case where the drop operation is performed; however, the object snapping function may be performed at any other timing. For example, in a state where the image data 51 has been already laid out as illustrated in FIG. 15A, the user performs the drag operation to lay out the new image data 60 in the spread page area 50. In the state of FIG. 15A, the reference line L1 for the object snapping is set at the position separated by the distance D1 from the binding position with reference to the image data 51 already laid out. The reference line L2 for the object snapping function is set also at the position (separated by distance D2=D1 from binding position) line-symmetric with respect to the binding position. In this state, when the new image data 60 is dragged within a predetermined distance from at least one of the reference lines L1 and L2 as illustrated in FIG. 15B, the image data 60 is automatically laid out along the guideline L as illustrated in FIG. 15C during the drag operation. The guideline L is displayed at this timing.

Each of the above-described exemplary embodiments is realized by executing the following processing: supplying software (program) realizing the functions of each of the above-described exemplary embodiments to a system or an apparatus through a network or various kinds of storage media, and causing a computer (e.g., CPU, microprocessing unit (MPU), and processor) of the system or the apparatus to read out and execute the program. The program may be executed by a single computer or a plurality of computers in cooperation with one another. Further, it is unnecessary to realize all of the above-described processing by software, and a part or all of the processing may be realized by hardware, such as an application specific integrated circuit (ASIC).

The entire processing may be performed by a single CPU or may also be appropriately performed by a plurality of CPUs in cooperation with one another.

According to the exemplary embodiments of the present disclosure, it is possible to improve user convenience by using the object snapping function.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146639, filed Aug. 8, 2019, which is hereby incorporated by reference herein in its entirety.

What is claimed is:

1. An information processing apparatus to perform an object snapping function of laying out a new object in a spread page area by automatically aligning a position of the new object with respect to a layout position of an object already laid out in the spread page area, the information processing apparatus comprising:
at least one processor causing the information processing apparatus to act as:
a mode selection unit configured to select a layout mode from an automatic layout mode and a manual layout mode, wherein, in a case where the automatic layout mode is selected, processing to determine a size of the object to be laid out in the spread page area and processing to determine the layout position of the object in the spread page area are automatically performed,
a selection unit configured to select an object as a selected object,
a switching unit configured to switch enabling and disabling of the object snapping function, wherein the object snapping function is disabled in the case where the automatic layout mode is selected, and the object snapping function is enabled in a case where the manual layout mode is selected, and
a layout unit configured to lay out the selected object in the spread page area by using the object snapping function in a case where the object snapping function is enabled.

2. The information processing apparatus according to claim 1, further comprising a reception unit configured to receive a user operation to switch enabling and disabling of the object snapping function,
wherein, in a case where the reception unit receives a user operation to disable the object snapping function in a state where the manual layout mode is selected and the object snapping function is enabled, the object snapping function is disabled.

3. The information processing apparatus according to claim 1,
wherein, in a case where image data is laid out in the spread page area in a state where the manual layout mode is selected and the object snapping function is enabled, the layout unit lays out the image data in the spread page area by using the object snapping function, and
wherein, in a case where another object, different from the image data, is laid out in the spread page area in the state where the manual layout mode is selected and the object snapping function is enabled, the layout unit lays out the other object in the spread page area without using the object snapping function.

4. The information processing apparatus according to claim 1, wherein, in a case where a number of pieces of image data laid out in the spread page area exceeds an upper limit in a state where the manual layout mode is selected and the object snapping function is enabled, the object snapping function is disabled.

5. The information processing apparatus according to claim 1, wherein, in a case where a number of reference lines for the object snapping function generated based on image data laid out in the spread page area exceeds an upper limit in a state where the manual layout mode is selected and the object snapping function is enabled, the object snapping function is disabled.

6. The information processing apparatus according to claim 1, further comprising a display control unit configured to display a reference line for the object snapping function in a case where operation to lay out the new object in the spread page area is performed in a state where the object snapping function is enabled.

7. A method for an information processing apparatus to perform an object snapping function of laying out a new object in a spread page area by automatically aligning a position of the new object with respect to a layout position of an object already laid out in the spread page area, the method comprising:
selecting a layout mode from an automatic layout mode and a manual layout mode, wherein, in a case where the automatic layout mode is selected, processing to determine a size of the object to be laid out in the spread page area and processing to determine the layout position of the object in the spread page area are automatically performed;
selecting an object as a selected object;
switching enabling and disabling of the object snapping function, wherein the object snapping function is disabled in the case where the automatic layout mode is selected, and the object snapping function is enabled in a case where the manual layout mode is selected; and
laying out the selected object in the spread page area by using the object snapping function in a case where the object snapping function is enabled.

8. The method according to claim 7, further comprising receiving a user operation to switch enabling and disabling of the object snapping function,
wherein, in a case where receiving includes receiving a user operation to disable the object snapping function in a state where the manual layout mode is selected and the object snapping function is enabled, the object snapping function is disabled.

9. The method according to claim 7,
wherein, in a case where image data is laid out in the spread page area in a state where the manual layout mode is selected and the object snapping function is enabled, laying out includes laying out the image data in the spread page area by using the object snapping function, and
wherein, in a case where another object, different from the image data, is laid out in the spread page area in the state where the manual layout mode is selected and the object snapping function is enabled, laying out includes laying out the other object in the spread page area without using the object snapping function.

10. The method according to claim 7, wherein, in a case where a number of pieces of image data laid out in the spread page area exceeds an upper limit in a state where the manual layout mode is selected and the object snapping function is enabled, the object snapping function is disabled.

11. The method according to claim 7, wherein, in a case where a number of reference lines for the object snapping function generated based on image data laid out in the spread page area exceeds an upper limit in a state where the manual layout mode is selected and the object snapping function is enabled, the object snapping function is disabled.

12. The method according to claim 7, further comprising displaying a reference line for the object snapping function in a case where operation to lay out the new object in the spread page area is performed in a state where the object snapping function is enabled.

13. A non-transitory computer-readable storage medium storing a program to cause a computer to perform a method for an information processing apparatus to perform an object snapping function of laying out a new object in a spread page area by automatically aligning a position of the new object with respect to a layout position of an object already laid out in the spread page area, the method comprising:

selecting a layout mode from an automatic layout mode and a manual layout mode, wherein, in a case where the automatic layout mode is selected, processing to determine a size of the object to be laid out in the spread page area and processing to determine the layout position of the object in the spread page area are automatically performed;

selecting an object as a selected object;

switching enabling and disabling of the object snapping function, wherein the object snapping function is disabled in the case where the automatic layout mode is selected, and the object snapping function is enabled in a case where the manual layout mode is selected; and laying out the selected object in the spread page area by using the object snapping function in a case where the object snapping function is enabled.

14. The non-transitory computer-readable storage medium according to claim 13, the method further comprising receiving a user operation to switch enabling and disabling of the object snapping function, wherein, in a case where receiving includes receiving a user operation to disable the object snapping function in a state where the manual layout mode is selected and the object snapping function is enabled, the object snapping function is disabled.

15. The non-transitory computer-readable storage medium according to claim 13, wherein, in a case where image data is laid out in the spread page area in a state where the manual layout mode is selected and the object snapping function is enabled, laying out includes laying out the image data in the spread page area by using the object snapping function, and wherein, in a case where another object, different from the image data, is laid out in the spread page area in the state where the manual layout mode is selected and the object snapping function is enabled, laying out includes laying out the other object in the spread page area without using the object snapping function.

16. The non-transitory computer-readable storage medium according to claim 13, wherein, in a case where a number of pieces of image data laid out in the spread page area exceeds an upper limit in a state where the manual layout mode is selected and the object snapping function is enabled, the object snapping function is disabled.

17. The non-transitory computer-readable storage medium according to claim 13, wherein, in a case where a number of reference lines for the object snapping function generated based on image data laid out in the spread page area exceeds an upper limit in a state where the manual layout mode is selected and the object snapping function is enabled, the object snapping function is disabled.

18. The non-transitory computer-readable storage medium according to claim 13, the method further comprising displaying a reference line for the object snapping function in a case where operation to lay out the new object in the spread page area is performed in a state where the object snapping function is enabled.

19. The information processing apparatus according to claim 1, wherein the at least one processor causes the information processing apparatus to further act as an output unit configured to output album data including the spread page area in which the selected object is laid out.

* * * * *